Patented Aug. 22, 1944

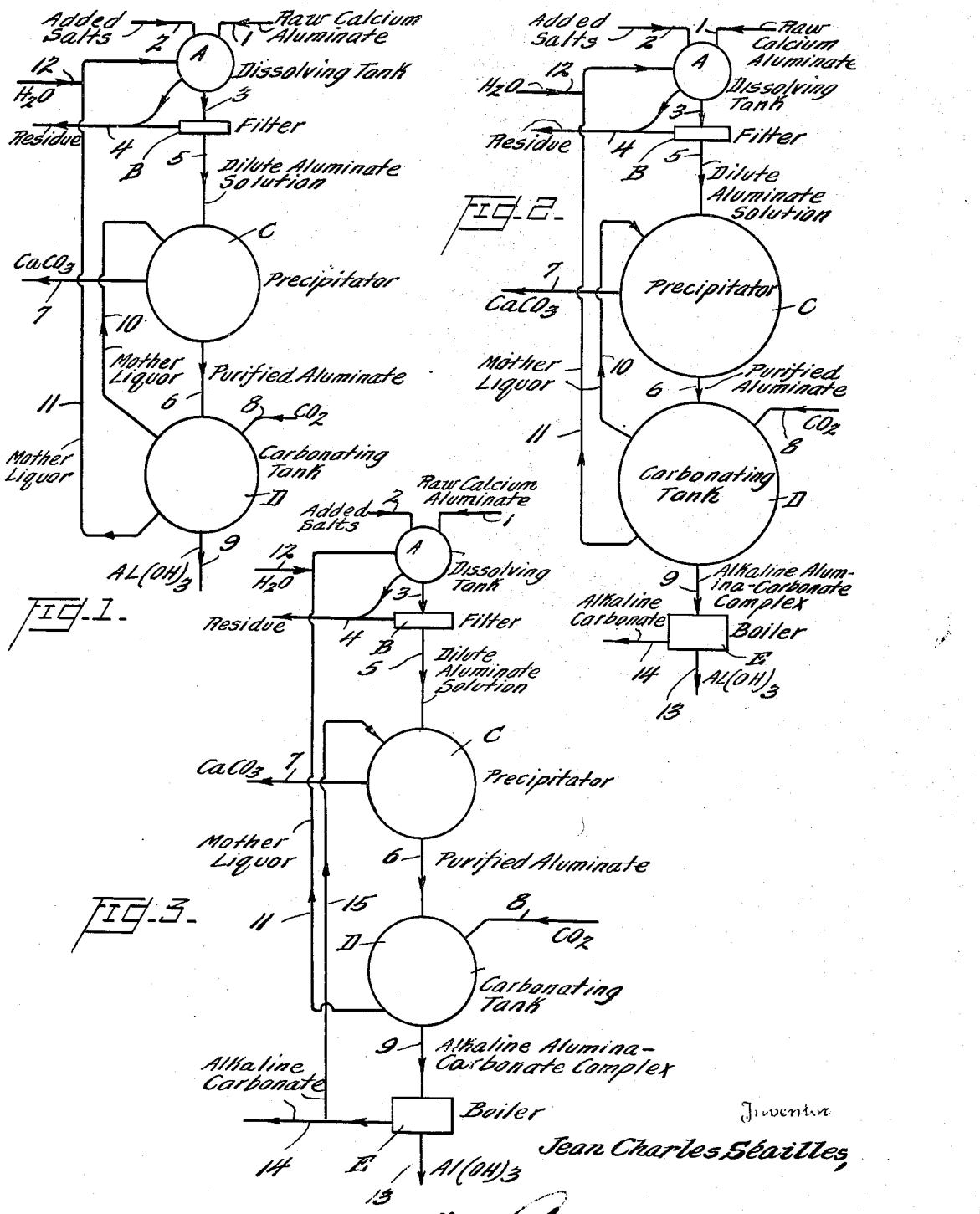

2,356,626

UNITED STATES PATENT OFFICE 2,356,626

METHOD FOR DISSOLVING RAW ALUMINATES OF LIME IN WATER AND RECOVERING ALUMINA FROM SUCH SOLUTIONS

Jean Charles Séailles, Paris, France; vested in the Alien Property Custodian

Application March 12, 1940, Serial No. 323,570
In France March 22, 1939

9 Claims. (Cl. 23—143)

When raw aluminates of lime are dissolved in water to extract aluminates of lime as a solution, a limit is rapidly reached over which efficiency falls whilst the solutions when oversaturated become unstable and difficult to handle.

The inventor has discovered certain new methods by which these difficulties are overcome.

According to these new methods, suitable means are used so as to insure the presence in the dissolving water of alkaline salts such as for instance caustic or carbonated alkalis. Under these conditions, higher extracting efficiencies may be reached and more stable solutions are obtained.

At the same time, certain other salts, which will be described later may be added to the solution in order to prevent silica from getting into solution and means are described to keep within proper limits the proportion of alkali and salts which might accumulate in the dissolving liquid specially when such liquid is working in closed circuit.

The invention also includes ways and means which may be used in connection with the said solution in order to precipitate more or less completely $CaCO_3$ in a first operation by the purifying effect of alkaline carbonate and later on alumina more or less free from calcium impurities.

The following description will explain more completely the details of the invention.

It must be clearly understood that the solutions referred to in this patent are always very diluted as opposed to the concentrated solutions usually employed in the usual technics working with alkaline-aluminate solutions.

The invention applies to solutions containing generally less than 5 grams of alumina and more often less than 1.5 grams of alumina per liter whilst the usual industrial solutions of alkaline alumina contain generally over 20 grams of alumina and more often 80 to 250 grams of alumina per liter.

At the same same, the solutions used according to this invention do not contain more than five grams alkali calculated as $Na_2CO_3$ and contain more generally less than one gram and further the molecular proportion of alkali is at a maximum equal and generally inferior to the molecular quantity of alumina getting into solution. When aluminates of lime are dissolved in water deprived of alkaline salt, dissolution becomes more and more difficult as the concentration of the solution increases; at the same time, the stability of such oversaturated solution decreases, with the result that a limit is quickly reached when efficiency begins to fall down.

In the presence of alkali, the soluble aluminate of lime is transformed partially (and eventually totally) into very soluble alkaline aluminate so that oversaturation of the aluminate of lime is easily avoided and stable solutions are obtained.

Further when stable solutions are used, it is possible to effect the dissolutions at temperatures which are not permissible with less stable or unstable solutions. For instance, dissolution under the conditions described may be carried at temperatures averaging and even exceeding 60° C., and, as aluminates of lime are more completely, more easily and more quickly extracted in hot solution, a substantial advantage is secured.

Only small quantities of alkali can be used because experimentation shows that if silica is to be avoided the alkaline content can only be present as a fraction of the alumina dissolved in the liquid. For instance, 0.200 to 0.400 gram only (counted as $Na_2CO_3$ or the equivalent molecular quantity of $K_2CO_3$) can be used in a solution containing 1 gram of alumina per liter if one does not provide that silica will also be dissolved in a proportion which would be detrimental in most cases. This proportion of 0.200 to 0.400 of $Na_2CO_3$ for 1 gram of alumina is equivalent to only 0.19 to 0.38 molecule of alkali for 1 molecule of alumina in solution. The inventor has discovered that this limit can be substantially raised on condition that the solution contains also other salts which act to stop silica from getting into solution. As an instance salts like alkali or alkaline earth sulfides, sulfates and chlorides separately or in mixture give the desired result.

It must be noted here that owing to equilibrium laws governing solutions containing at the same time alkali and alkaline earth all the salts present will divide into a necessary proportion of alkali salts and alkaline earth salt of each sort.

As an example, a solution giving excellent results contained per liter:

Alkali (counted as $Na_2O+K_2O$)__ 0.700 to 0.900
Sulfur combined as sulfides_____ 0.150 to 0.180
$SO_3$ combined as sulfates_____ 0.200 to 0.250

Generally, under these new conditions with a solvent liquid containing not more than 0.8 gram to 0.9 gram alkali carbonate calculated as $Na_2CO_3$ before dissolving the raw aluminate and resulting in solutions with about 1 gram alumina per liter after dissolution, the quantity of silica dissolved is practically negligible.

With higher molecular proportion of alkali to alumina, it is still possible to have only an acceptable proportion of silica in the solution whilst the equilibrium solution may contain all its alumina as alkaline aluminate with practically no alkaline earth aluminate in solution.

In order to get solvent liquid containing the elements which have been described, two ways may be employed: The salts may be added to the solvent water or these salts or their constituents may be brought in (totally or partially) by the raw materials to be dissolved, which may be chosen so that they will contain automatically the desired components.

In order to better understand this point, it must be explained that, under industrial conditions the solvent liquid is utilized in a closed circuit organized as follows: The solving liquid is mixed and agitated with the raw material to be dissolved, exhausted residues are separated, the clean solution is treated (generally by $CO_2$ injection) in order to separate alumina as a precipitate and the solving liquid free from alumina, and eventually of other precipitated elements (such as $CaCO_3$) goes back to dissolve again a new quantity of raw material.

If the raw material does not contain the additional salts which must be present in the solvent liquid, these must be regularly added in small proportion to make up for the unavoidable losses of the circuit.

If, on the contrary, the additional salts are automatically brought in by the raw materials it may happen that they will accumulate in the circuit and exceed in the long run the desired proportions, in this case, a proportion of the solvent liquid may be regularly taken off and replaced by fresh water in order to keep the solvent solution within the proper limits.

As an example of a raw material containing, at the same time as soluble aluminate of lime, the salts necessary for the invention, the following analysis is given:

| | |
|---|---|
| $SiO_2$ | 21.95 |
| $Fe_2O_3$ | 5.57 |
| $Al_2O_3$ | 11.74 |
| CaO | 56.97 |
| $SO_3$ | 0.60 |
| S | 1.59 |
| Alkalies as $Na_2O$ | 0.15 |
| Alkalies as $K_2O$ | 0.55 |

It has been found that the solvent liquid may be, in certain cases, automatically kept within the proper limits for certain salts and eventually for all the salts and this is a great simplification.

As regards sulfides and sulfates the regulation is automatic because the sulfide and the sulfate of calcium cannot exceed a very limited solubility whilst on the other hand the alkaline sulfides and sulfates have their solubility limited in the presence of aluminate of lime, according to the following equations:

The result is that $Na_2S$ and $Na_2SO_4$ cannot accumulate over the limit where they are transformed into the calcium equivalent salts and in their turn the calcium salts are precipitated with the residue as soon as they exceed their limit of solubility and, eventually as basic sulfate of alumina.

As regards the alkalis, their concentration may also be limited in the case where $CO_2$ is used to separate alumina, as the inventor has found that under proper condition alkalis may be precipitated partially together with the alumina, probably as a double carbonate of alkali and alumina.

For instance, with an industrial lye containing per liter 0.6 gram of potash and 0.1 gram of soda (counted as $K_2O$ and $Na_2O$) with 1 gram of alumina treated by $CO_2$ at a temperature of 50 to 60° centigrade, the alkalis are partially precipitated together with the alumina.

This is a very interesting way to automatically control alkalis content in the lyes and further when the raw material contain alkalis (as it is often the case) this method has in addition the advantage of recuperating a valuable material.

Alkaline concentration may also be limited by other means. It has been limited so that silica is soluble only when alkalis exist in the solution as free caustic alkalis or as ionisable salts such as the carbonates. On the contrary, silica is not dissolved by alkali salts since they are practically not hydrolyzable unless relatively high concentrations are reached. This gives the possibility of regulating the alkaline ionisable concentration within the desired limits as it is easy to convert in proper proportion ionisable salts into non-ionisable salts by very simple means.

The desired result will be obtained if the alkaline ionisable salts are converted into chlorides or sulfates and this may be conveniently realized by an addition of the corresponding acids HCl or $H_2SO_4$) or more economically by adding alkaline earth chlorine or sulfate which give by double decomposition $CaCO_3$ and the desired alkaline chlorine or sulfate in the part of the circuit where the alkalis necessarily exist in the carbonated state.

When using carbonic acid precipitation, it has been found that the best condition for the solvent liquid returning in circuit to dissolve a new quantity of raw-material is reached when the solution is near the point where phenolphthalein is just discoloured. If the solvent liquid is alkaline, efficiency is lower and if it is acid, efficiency falls again.

When the described methods are used, the invention gives solutions which contain alumina dissolved as a mixture of alkaline aluminates and alkaline earth aluminates and at the limit in the state of alkaline aluminate alone.

Precipitation of alumina from the said solution is carried by $CO_2$. Now it is well known that precipitation of alkaline aluminates by $CO_2$ at temperatures inferior to 75/80° centigrade even in the presence of seeding alumina gives only gelatinous and more or less colloidal precipitates which are very difficult to filter and to utilize. The inventor has now found that with the diluted solutions which he uses it is possible to obtain, without heating the lyes at the specified temperature (75 to 80°), precipitates of very good quality easy to filter and to handle.

These precipitates of good quality are obtained when precipitation is carried over and over again in the presence of the precipitates formed in successive operations continuously agitated and kept or sent back, continuously, in the reaction vessel until suitable quality is reached. Under these conditions, it has been found that the final precipitate becomes more and more dense and easy to filter and to handle.

As an example, I will describe batch operation. A first batch of solution is treated by $CO_2$ and after decantation the clear mother-lye is separated whilst the whole precipitate remains in the carbonating tank. A new supply of solution is admitted in the tank and treated by $CO_2$ whilst the first precipitate is agitated in the new solution. Decantation follows and separation of the mother-lye: the whole precipitate (from the two operations) remaining in the tank. This succession of operation is continued until suitable quality is obtained.

Of course, instead of batch operations, a continuous circuit may be utilized for instance by combining a carbonating vessel and a decanting tank. In this case, the precipitate from the decanting tank is continuously pumped back into the carbonating vessel until proper grade of precipitate is obtained after which the precipitate may be utilized or the circuit regulated so that a fraction of the precipitate goes back to carbonating tank as a seed whilst another fraction is taken off and utilized.

Generally, the solutions obtained according to the invention contain a proportion of lime which is precipitated together with the alumina under $CO_2$ action as only in very exceptional cases the circuits may be organized so as to contain all the alumina as alkaline aluminate. (For instance, when raw materials very poor in silica are used or when a certain proportion of silica will not be detrimental or when solutions are obtained in a very diluted state e. g. less than half a gram of alumina per liter.)

The inventor has however found that it is possible and advantageous to obtain directly a precipitate of alumina containing practically no lime or only a small proportion of lime. This result will be obtained by adding to the solutions (obtained from the raw material according to the invention) before precipitating the alumina by $CO_2$ a proper proportion of alkaline carbonate (with or without bicarbonates).

Under these conditions all the calcium salts present in the solution will be transformed into $CaCO_3$ and replaced by soluble alkaline salts as follows:

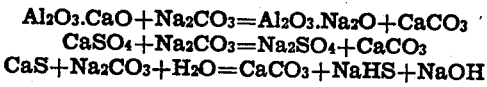

The solution so treated and separated by known means from solid $CaCO_3$ is then treated by $CO_2$ and the alumina recovered contains practically no calcium salt.

The addition of alkaline carbonate into the solution may be realized simply by taking back a proper fraction of the mother-lye from the precipitation of $Al_2O_3$ by $CO_2$ in a partially closed circuit. This is possible because when the carbonating operation treats a lye previously deprived of $CaCO_3$ according to the proposed method, the mother-lye from carbonation contains alkaline carbonate according to the equation

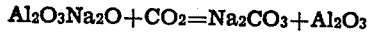

This alkaline carbonate can therefore be used as a means of providing alkali for the proposed operation.

Practically it will be better to send back an excess of mother-lye to avoid exact regulation and it is preferred to avoid an excess of alkaline bicarbonate which can be easily realized by proper regulation of the carbonation operation or by suitable corrections.

Figs. 1, 2 and 3 give schematic examples of certain methods of working out the invention.

Fig. 1 illustrates the case where the raw aluminate does not bring in the necessary additional salts and more specially does not contain alkaline salts or does not contain enough alkaline salts.

A is the dissolving tank.

B comprises filters or decanters or both.

C is the precipitating device for $CaCO_3$ by alkaline carbonate coming back from D.

The pipes are numbered 1 to 12.

The precipitating devices generally comprise a mixing vessel and a decanting tank to separate the precipitate with eventually a finishing filter.

D shows the carbonating device where $Al_2O_3$ is precipitated. This carbonating device will generally comprise a carbonating vessel where the reaction takes place and a decanting tank to separate the alumina with eventually a finishing filter. The raw aluminate goes through 1 into A whilst the supplementary salts are introduced at 2. As the circuit is closed, after the first quantity necessary to get the desired proportion in the circuit salts are only injected to make up the losses.

The solution from A goes off by 3 and 5 through B to C. The residual muds are sent off by 4.

The clear solution is received in C through 5 and is mixed there with the epurating mother-lye coming back from D through 10.

The lime carbonate is evacuated by 7. The purified solution goes into D by 6.

D receives $CO_2$ necessary for the carbonation through 8, alumina is extracted through 9 and the mother-lye goes back partly through 10 to C as a purifier and partly through 11 to A to act again as a solving liquid.

Make-up water is admitted at 12.

Fig. 2 illustrates the case where the raw aluminate contains the desired alkaline salts so that the circuit would get progressively more and more rich in alkalis and where regulation is realized by precipitating the alkalis as explained by regulating the carbonating operation so as to precipitate the excess of alkalis probably as double carbonate of alumina and alkalis. The references are the same as Fig. 1 except that E is a boiler where the complex precipitates of alumina and alkalis are decomposed by heat action into insoluble alumina and soluble alkaline carbonate.

This boiler receives through 9 the precipitate and delivers the alumina through 13 and the dissolved alkaline carbonate through 14.

The rest of the circuit does not differ from Fig. 1.

Fig. 3 illustrates the case where the precipitation of $CaCO_3$ in C instead of being obtained through sending back the diluted moter-lye as in Figs. 1 and 2 is realized by sending back through 15 a proper proportion of the more concentrated alkaline carbonate recovered in E.

Of course, these three examples are not given as a limitation to equivalent ways of realizing the invention. For instance, the regulation of the proportion of ionisable alkalies may be realized by a proper addition, in the mother-lye going back to solution, of the salts or acids which have been described or by replacing a given proportion of mother-lye taken away by fresh water.

It will be evidently understood that precipitates obtained from the different steps, such as $CaCO_3$, mixtures of $CaCO_3$ and alumina or mixtures of carbonates of alumina and alkalis in different grades may be used for any industrial purpose for which they are suitable, without getting out of the scope of the invention although this is more specially intended to be used for the manufacture of alumina.

It is also to be understood that the invention may be modified in details without departing from the spirit of the invention especially as defined in the appended claims.

Having now particularly described and ascertained the nature of my said invention and in what manner the same is to be performed, I declare that what I claim is:

1. In dissolving raw calcium aluminate to form a stable solution, the method which comprises extracting the raw aluminate with an aqueous solution of an ionizable alkaline compound chosen from the group consisting of hydroxides and carbonates of the alkali metals, the solution of said alkali used having not in excess of 1 molecule for 1 molecule of alumina in the extracted aluminate, the solution being used in the proportion of at least 1000 parts to 5 parts of dissolved aluminate.

2. The process described in claim 1, the said solution for extraction of the aluminate including a substantial proportion of an agent adapted to retard solution of silica, the said agent being selected from the group consisting of the sulfides, sulfates, and chlorides of the alkali and the alkaline earth metals.

3. In the preparation of an aluminate solution, the method which comprises extracting raw aluminate with an aqueous solution including an alkaline compound of an alkali metal selected from the group consisting of hydroxides and carbonates of the alkali metals and an alkali metal sulfide, the sulfide retarding solution of silica.

4. The process described in claim 1, including treating the resulting stable solution with carbon dioxide in contact with seeding precipitate from a similar previous treatment, so as to form aluminum hydroxide in readily separable condition.

5. The process described in claim 1, including treating the resulting stable solution with carbon dioxide and alumina, to cause precipitation of aluminum hydroxide, separating the precipitated aluminum hydroxide from the remaining liquor, and reaction of the alkali present in the said liquor with additional raw calcium aluminate so as to reuse the alkali and reduce the alkalinity of the solution.

6. The process described in claim 1, including treating the resulting stable solution with carbon dioxide and alumina, to cause precipitation of aluminum hydroxide, separating the precipitated aluminum hydroxide from the remaining liquor, and reaction of the alkali present in the said liquor with additional raw calcium aluminate so as to reuse the alkali and reduce the alkalinity of the solution, the treatment with alumina and carbon dioxide being effected at a temperature of about 50 to 60° C.

7. The process described in claim 1, including treating the resulting stable solution with carbon dioxide and alumina, to cause precipitation of aluminum hydroxide, separating the precipitated aluminum hydroxide from the remaining liquor, and reaction of the alkali present in the said liquor with additional raw calcium aluminate so as to reuse the alkali and reduce the alkalinity of the solution, the said stable solution being first treated with additional sodium carbonate, in order to precipitate calcium as carbonate, before the carbon dioxide and alumina are added.

8. The process described in claim 1, including treating the resulting stable solution with carbon dioxide and alumina, to cause precipitation of aluminum hydroxide, separating the precipitated aluminum hydroxide from the remaining liquor, and reaction of the alkali present in the said liquor with additional raw calcium aluminate so as to reuse the alkali and reduce the alkalinity of the solution, the resulting precipitate containing alumina and some alkali being subjected to treatment with boiling water so as to cause separation of the alkali from the alumina in the form of an aqueous solution of the alkali.

9. The process described in claim 1, the concentration of alkali being maintained substantially constant during the entire operation of dissolving the aluminate.

JEAN CHARLES SEAILLES.